(12) United States Patent
Ma

(10) Patent No.: US 12,282,747 B2
(45) Date of Patent: Apr. 22, 2025

(54) METHOD FOR HUMAN-MACHINE DIALOGUE, COMPUTING DEVICE AND COMPUTER-READABLE STORAGE MEDIUM

(71) Applicant: UBTECH ROBOTICS CORP LTD, Shenzhen (CN)

(72) Inventor: Li Ma, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 322 days.

(21) Appl. No.: 17/870,813

(22) Filed: Jul. 21, 2022

(65) Prior Publication Data

US 2022/0358297 A1 Nov. 10, 2022

Related U.S. Application Data

(63) Continuation of application No. PCT/CN2021/131221, filed on Nov. 17, 2021.

(30) Foreign Application Priority Data

Dec. 29, 2020 (CN) .......................... 202011591934.9

(51) Int. Cl.
*G06F 40/58* (2020.01)
*G06F 16/33* (2025.01)
(Continued)

(52) U.S. Cl.
CPC .......... *G06F 40/58* (2020.01); *G06F 16/3329* (2019.01); *G06F 16/3337* (2019.01);
(Continued)

(58) Field of Classification Search
CPC .. G06F 40/58; G06F 16/3329; G06F 16/3337; G06F 16/3343; G06F 16/3344; G06F 16/90332; G06F 40/47; G06N 20/00
(Continued)

(56) References Cited

U.S. PATENT DOCUMENTS 10,339,916 B2 * 7/2019 Sarikaya ................ G06N 20/20
11,194,973 B1 * 12/2021 Goel ........................ G06N 3/08
(Continued)

FOREIGN PATENT DOCUMENTS

AU 2006201926 A1 * 12/2006
CN 108228574 A * 6/2018 ............. G06F 16/36
(Continued)

OTHER PUBLICATIONS

ISR for PCT/CN2021/131221.
Written opinions of ISA for PCT/CN2021/131221.

*Primary Examiner* — Edwin S Leland, III

(57) ABSTRACT

A method includes: acquiring an input sentence in a first language in a current round of conversation; translating the input sentence in the first language to obtain an input sentence in a second language, according to dialogue contents in the first language and dialogue contents in the second language that have a mutual translation relationship with the dialogue contents in the first language in historical rounds of conversation; invoking a multi-round conversation generation model to parse the input sentence in the second language in the current round of conversation to generate an output sentence in the second language in the current round of conversation; translating the output sentence in the second language in the current round of conversation to obtain at least one candidate result in the first language; and determining an output sentence in the first language from the at least one candidate result in the first language.

20 Claims, 10 Drawing Sheets

(51) Int. Cl.
   *G06F 16/332*     (2025.01)
   *G06F 16/3329*    (2025.01)
   *G06F 16/3332*    (2025.01)
   *G06F 16/334*     (2025.01)
   *G06F 16/9032*    (2019.01)
   *G06F 40/47*      (2020.01)
   *G06N 20/00*      (2019.01)

(52) U.S. Cl.
   CPC ...... *G06F 16/3343* (2019.01); *G06F 16/3344* (2019.01); *G06F 16/90332* (2019.01); *G06F 40/47* (2020.01); *G06N 20/00* (2019.01)

(58) Field of Classification Search
   USPC .......................................................... 704/2
   See application file for complete search history.

(56) References Cited

U.S. PATENT DOCUMENTS

| | | | | |
|---|---|---|---|---|
| 2017/0371867 A1* | 12/2017 | Hughes | .................. | G06F 40/51 |
| 2018/0314689 A1* | 11/2018 | Wang | .................. | G10L 15/1822 |
| 2020/0066254 A1* | 2/2020 | Hiroe | ...................... | H04W 4/00 |
| 2021/0035230 A1* | 2/2021 | Cohen | .................... | G06F 40/35 |
| 2021/0150146 A1* | 5/2021 | Alexander | .............. | G06F 40/30 |
| 2022/0358297 A1* | 11/2022 | Ma | .................... | G06F 16/90332 |

FOREIGN PATENT DOCUMENTS

| | | | | | |
|---|---|---|---|---|---|
| CN | 108228574 | B | * | 7/2020 | ............. G06F 16/36 |
| CN | 111460091 | A | * | 7/2020 | ........... G06F 16/334 |
| CN | 111460115 | A | * | 7/2020 | ........ G06F 16/3329 |
| CN | 112100354 | A | * | 12/2020 | ........ G06F 16/3329 |
| CN | 112579760 | A | * | 3/2021 | ........ G06F 16/3329 |
| CN | 213674144 | U | * | 7/2021 | |
| CN | 111460115 | B | * | 5/2023 | ........ G06F 16/3329 |
| CN | 112100354 | B | * | 7/2023 | ........ G06F 16/3329 |
| CN | 116595144 | A | * | 8/2023 | |
| CN | 112579760 | B | * | 1/2024 | ........ G06F 16/3329 |
| DE | 102016221564 | A1 | * | 4/2018 | ............. G06F 3/017 |
| ES | 2238008 | A1 | * | 8/2005 | ........... G06F 17/289 |
| ES | 2238008 | B1 | * | 2/2006 | ........... G06F 17/289 |
| KR | 20100041019 | A | * | 4/2010 | |
| KR | 20210032200 | A | * | 3/2021 | |
| TW | 201201196 | A | * | 1/2012 | |
| TW | I386917 | B | * | 2/2013 | |
| WO | WO-2005062200 | A1 | * | 7/2005 | ........... G06F 17/289 |
| WO | WO-2017040437 | A1 | * | 3/2017 | ............. G06N 20/20 |

* cited by examiner

| Query Text in Chinse | Query Text in English | Reply Text in English | Reply Text in Chinese |
|---|---|---|---|
| 你喜欢游泳吗？ | Do you like swimming? | Yes, I do. | 是的，我做；或是的，我愿意。 |
| 你喜欢小孩吗？ | Do you love kids? | Yes, I love kids. | 是的，我爱小孩；或是的，我爱山羊。 |

FIG. 1

METHOD FOR HUMAN-MACHINE DIALOGUE, COMPUTING DEVICE AND COMPUTER-READABLE STORAGE MEDIUM

CROSS REFERENCE TO RELATED APPLICATIONS

The present application is a continuation-application of International Application PCT/CN2021/131221, with an international filing date of Nov. 17, 2021, which claims foreign priority of Chinese Patent Application No. 202011591934.9, filed on Dec. 29, 2020 in the China National Intellectual Property Administration of China, the contents of all of which are hereby incorporated by reference.

BACKGROUND

1. Technical Field

The present disclosure generally relates to human/machine interaction, and particularly to a method and a computing device for human-machine dialogue.

2. Description of Related Art

With the continuous advancement of technology, human-machine dialogue technology has been widely used in chat robots, mobile phone assistants, intelligent customer service, voice navigation and other scenarios. Ensuring the correct and smooth realization of multi-round human-machine conversation is an important effect that human-machine dialogue technology needs to achieve. However, this may be challenging because the richness of the multi-round conversation corpora of different languages in the open domain is different. Specifically, the multi-round conversation corpora in high-resource languages (for example, English) in the open domain is extremely rich, while the multi-round conversation corpora in low-resource languages (for example, Chinese, Japanese, Korean, etc.) in the open domain is relatively insufficient. As a result, the multi-round conversation generation model corresponding to the high-resource languages is more mature than the multi-round conversation generation model for the low-resource languages. It is thus easier to achieve correct and smooth multi-round human-machine conversation for high-resource languages. Therefore, there is a need to provide a method and a device to achieve correct and smooth multi-round human-machine conversation for low-resource languages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 1 is a schematic diagram showing a table of exemplary query texts and reply texts.

DETAILED DESCRIPTION

Figure 2:
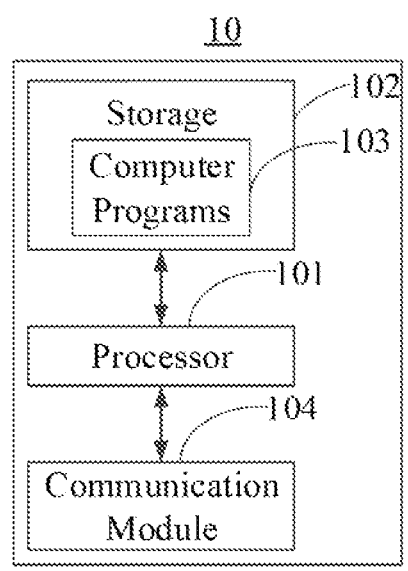
FIG. 2 is a schematic block diagram of a computing device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

One conventional approach for realizing multi-round human-machine conversation for low-resource languages is to use machine translation technology to directly translate a query text in the low-resource languages into a query text in the high-resource languages. Then, a multi-round conversation generation model trained by the multi-round conversation corpora of high-resource languages in the open domain is used to generate a corresponding reply text in high-resource languages for the translated query text in high-resource languages. The generated reply text in the high-resource languages is then translated into the reply text in the low-resource languages for output, which completes one round of human-machine conversation in the low-resource languages. Here, one round of human-machine conversation in the low-resource languages includes an input query text in the low-resource languages and an output reply text in the low-resource languages.

However, it should be noted that the inter-translation operation between the sentences in low-resource languages and the sentences in high-resource languages sentences executed in the foregoing approach may tend to result in incongruity in semantics and context between the query text and reply text in the low resource languages. The overall degree of expression coherence is not high, and there are even cases where the reply text fails to convey the correct meaning.

For example, for a query text "Do you like swimming" in Chinese in row 2, column 1 in the table shown in FIG. 1, it will be literally translated into English query text "Do you like swimming" by a machine translation model. The translated English query text will then be processed by an English multi-round conversation generation model that may generate an English reply text "Yes, I do." Then, the English reply text "Yes, I do" is literally translated through the machine translation model, and may be translated into a Chinese reply text shown in row 2, column 4 in the table of FIG. 1, which literally means "Yes, I make," and "Yes, I will," which is different from a typical response "Yes, I like" in Chinese to the query text in row 2, column 1 in the table of FIG. 1. It is obvious that the degree of expression coherence between the Chinese query text and Chinese reply text is not high.

For another query text "Do you like kids" in Chinese in row 3, column 1 in the table shown in FIG. 1, it will be literally translated into English query text "Do you love kids" by a machine translation model. The translated English query text will then be processed by an English multi-round conversation generation model that may generate an English reply text "Yes, I love kids." Since kid may mean a child or a young goat, the English reply text "Yes, I love kids" may be literally translated into a Chinese reply text "Yes, I love kids" or "Yes, I love young goats" shown in row 3, column 4 in the table of FIG. 1. The latter Chinese reply text completely loses relevance with a typical Chinese response "Yes, I like kids" to the Chinese query text in row 3, column 1 in FIG. 1, which leads to extremely incongruity in semantics and context between the Chinese query text and the Chinese reply text. The overall degree of expression coherence is not high, and the reply text may have little or no relevance to the query text.

In this case, in order to ensure that the multi-round conversation generation model of high-resource languages can be used for low-resource languages to realize correct and smooth multi-round human-machine conversation, the embodiments of the present disclosure provide a method, a computing device and a computer readable storage medium for human-machine dialogue.

Embodiments of the present disclosure will be described in detail below with reference to the accompanying drawings. The following embodiments and features of the embodiments may be combined with each other if there is no conflict.

FIG. 2 shows a schematic block diagram of a computing device 10 according to one embodiment. The computing device 10 uses a multi-round conversation generation model of a high-resource language to realize the multi-round human-machine conversation in a low-resource language, while combining the specific situation of the existing dialogue content into the translation process between sentences in the low-resource language and in the high-resource language, which enable the conversation in the low-resource language to have an excellent degree of coherence in terms of semantics and context. As a result, the multi-round conversation generation model of a high-resource language can be used for a low-resource language to achieve correct and smooth multi-round human-machine conversation. The computing device 10 may be, but is not limited to, a smartphone, a tablet computer, a personal computer, a server, a conversational robot, and the like.

In one embodiment, the computing device 10 may include a processor 101, a storage 102, one or more executable computer programs 103 that are stored in the storage 102, and a communication module 104. The storage 102, the processor 101 and the communication module 104 are directly or indirectly electrically connected to each other to realize data transmission or interaction. For example, the storage 102, the processor 101 and the communication module 104 can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the computing device, such as steps S210 to S250 in FIG. 3, steps S251 and S252, steps S260 to S280, and steps S271 to S276 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the computing device, such as a hard disk or a memory. The storage 102 may also be an external storage device of the computing device, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the computing device. The storage 102 can also be used to temporarily store data that have been output or is about to be output.

The storage 102 further stores a multi-round conversation generation model, which is trained based on the multi-round conversation corpora in the open domain corresponding to a high-resource language. The multi-round conversation generation model can generate corresponding output sentences as reply content for the input sentences in the resource language.

Figure 7:
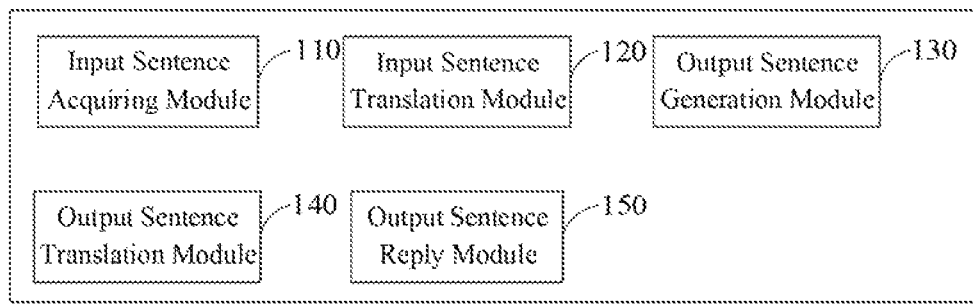
FIG. 7 is a schematic block diagram of a human-machine dialogue module according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the computing device. For example, the one or more computer programs 112 may be divided into an input sentence acquiring module 110, an input sentence translation module 120, an output sentence generation module 130, an output sentence translation module 140, and an output sentence reply module 150 as shown in FIG. 7.

In one embodiment, the communication module 13 is to establish a communication connection between the computing device 10 and other electronic devices through a network, and to send and receive data through the network. The network may include a wired communication network and/or a wireless communication network. For example, the computing device 10 can receive a query text in a low-resource language from a client device of a user through the communication module 13. The computing device 10 may output a reply text to the client device through the communication module 13 after the reply text for the query text in the low-resource language is generated. The computing device 10 can transmit the reply text in the low-resource language to an audio playback device through the communication module 13 for voice playback.

In one embodiment, the computing device 10 may include a human-machine dialogue module that may be in the form of at least one software function module stored in the storage 102 or software or firmware burnt in the operating system of the computing device 10. The processor 101 may execute executable modules stored in the storage 102, such as software function modules and computer programs included in the human-machine dialogue module. With the human-machine dialogue module, the computing device 10 can use a multi-round conversation generation model of a high-resource language to realize the multi-round human-machine conversation in a low-resource language, while combining the specific situation of the existing dialogue content into the translation process between sentences in the low-resource language and in the high-resource language, which can improve the semantic and contextual expression coherence of multi-round human-machine dialogue content in low-resource languages.

It should be noted that the block diagram shown in FIG. 2 is only an example of the computing device 10. The computing device 10 may include more or fewer components than what is shown in FIG. 2, or have a different configuration than what is shown in FIG. 2. Each component shown in FIG. 2 may be implemented in hardware, software, or a combination thereof.

In order to ensure that the computing device 10 can use the multi-round conversation generation model of the high-resource language to realize the multi-round human-machine conversation in the low-resource language while improving the expression coherence of the multi-round human-machine conversation in low-resource languages in terms of semantics and context, embodiments of the present disclosure provide a method for human-machine dialogue, which will be described in detail below.

Figure 3:
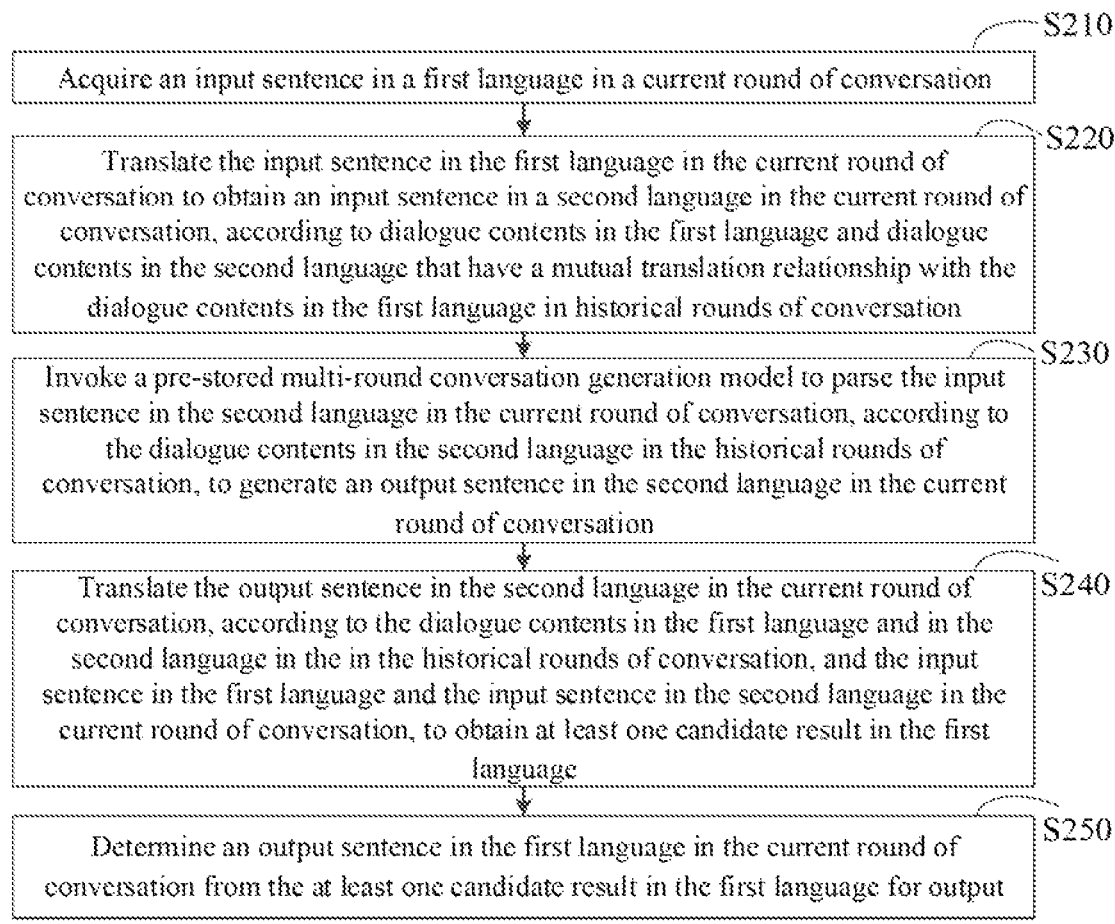
FIG. 3 is an exemplary flowchart of a method for a human-machine dialogue according to one embodiment.

FIG. 3 shows an exemplary flowchart of a method for human-machine dialogue according to one embodiment. The method may include steps S210 to S250.

Step S210: Acquire an input sentence in a first language in a current round of conversation.

In one embodiment, the input sentence in the first language is a sentence input by a user in a low-resource language as a query text. In one embodiment, the computing device 10 can collect the query speech spoken by the user in a low-resource language by controlling a peripheral voice pickup device, and perform text conversion on the query speech collected by the voice pickup device to obtain the input sentence in the first language. In another embodiment, the computing device 10 may provide the user with a text input interface, so that the user can input the input sentence in the first language in the current round of conversation in the text input interface.

Step S220: Translate the input sentence in the first language in the current round of conversation to obtain an input sentence in a second language in the current round of conversation, according to dialogue contents in the first language and dialogue contents in the second language that have a mutual translation relationship with the dialogue contents in the first language in historical rounds of conversation.

In one embodiment, the dialogue contents in the first language may include input sentences in the first language and output sentences in the first language in corresponding rounds of conversation, and the dialogue contents in the second language may include input sentences in the second language and output sentences in the second language in corresponding rounds of conversation. There is a mutual translation relationship between the input sentences in the first language and the input sentences in the second language in the same round of conversation, and there is a mutual translation relationship between the output sentences in the first language and the output sentences in the second language in the same round of conversation. The first language is a low-resource language (e.g., Chinese), and the second language is a high-resource language (e.g., English).

After acquiring the input sentence in the first language in the current round of conversation, the computing device 10 will translate the input sentence in the first language in the current round of conversation based on the dialogue contents in the first language and the dialogue contents in the second language in the historical round of conversation before the current round of conversation. Therefore, the context information and wording of the multi-round human-machine conversation in the first language and the context information and wording in the multi-round human-machine conversation in the second language are fully considered. As a result, the translated input sentences in the second language of the current round of conversation can fully match, in terms of words, the dialogue contents in the first language and the dialogue contents in the second language in the historical rounds of conversation.

In one embodiment, the computing device 10 may store a first sentence translation model for sentence translation from the first language to the second language based on historical dialogue contents. The first sentence translation model can be obtained by performing training parallel corpora between the second language and the first language of multiple rounds of continuous conversation in the open domain. Each parallel corpus required for training the first sentence translation model can be expressed by a long corpus sequence as follows: [ . . . , $L_{t-2}$, $H_{t-2}$, $L_{t-1}$, $H_{t-1}$, $L_t$, $H_t$], where H represents the sentences in the second language, L represents the sentences in the first language, $H_{t-n}$ represents a translated parallel corpus of $L_{t-n}$ that has the same subscript with $H_{t-n}$, where n=0, 1, 2, 3, 4 . . . . The first-language conversation operation of the same round of conversation may include the input operation of the input sentence in the first language and the output operation of the output sentence in the first language in the round of conversation. The second-language conversation operation of the same round of conversation may include the input operation of the input sentence in the second language and the output operation of the output sentence in the second language in the round of conversation. If t is an even number, $L_t$ represents the output sentence in the first language in the t/2th round of conversation, $L_{t-1}$ represents the input sentence in the first language in the t/2th round of conversation, $H_t$ represents the output sentence in the second language in the t/2th round of conversation, $H_{t-1}$ represents the input sentence in the second language in the t/2th round of conversation, $H_{t-2}$ represents the output sentence in the second language in the (t−2)/2th round of conversation, and $L_{t-2}$ represents the output sentence in the first language in the (t−2)/2th round of conversation. If t is an odd number, $L_t$ represents the input sentence in the first language in the (t+1)/2th round of conversation, $L_{t-1}$ represents the output sentence in the first language in the (t−1)/2th round of conversation, $H_t$ represents the input sentence in the second language in the (t+1)/2th round of conversation, $H_{t-1}$ represents the output sentence in the second language in the (t−1)/2th round of conversation, $H_{t-2}$ represents the input sentence in the second language in the (t−1)/2th round of conversation, and $L_{t-2}$ represents the input sentence in the first language in the (t−1)/2th round of conversation.

In one embodiment, each sentence in the above-mentioned long corpus sequence can be expressed by a sentence sequence including words and punctuation in the first language or the second language. For example, the sentence sequence corresponding to the sentence "Hello, John." can be expressed as ["Hello", ",", "John", "."]. In this case, the sentence sequence includes four sequence elements, and each sequence element represent the character composition of the corresponding sentence. Each of the sequence elements may represent one of the words and punctuations corresponding to the first language or the second language.

In the process of training the first sentence translation model, for the long corpus sequence of each parallel corpus used to train the first sentence translation model, the subsequence [ . . . , $L_{t-2}$, $H_{t-2}$, $L_{t-1}$, $H_{t-1}$, $L_t$] in the long corpus sequence can be used as the model input and the subsequence [$H_t$] can be used as the model output to train the first sentence translation model, which can ensure that the trained first sentence translation model can realize the sentence translation function from the first language to the second language based on historical dialogue contents.

In one embodiment, the long corpus sequence of each parallel corpus used to train the first sentence translation model needs to satisfy a preset first number of sequence element tokens. Each sequence element token carries one sequence element content. The first number may be set to 256.

Therefore, for each parallel corpus for training the first sentence translation model, it needs to preferentially select the output sentence in the second language or the input sentence in the second language of a certain round of conversation in the parallel corpus as a terminating sentence. Then, the sequence elements of the terminating sentence, the sequence elements of the output sentence in the first language or the input sentence in the first language corresponding to the terminating sentence, and the sequence elements of the first-language dialogue contents and the second-language dialogue contents of the round of conversation before the terminating sentence are put into a blank long sequence from right to left and in reverse order of the time sequence of rounds of conversation, so as to allow the expression form of the long sequence to be consistent with the above-mentioned long corpus sequence. Then, the total number of sequence elements of the valid sentences in the long sequence is counted, and it is determined whether the total number of the sequence elements is less than the first number.

If the total number of the sequence elements is less than the first number, a specific number of blank sequence elements need to be filled on the left portion of the long sequence. Then, the sequence elements in the long sequence from left to right are put together to obtain the final long corpus sequence of the parallel corpus. The specific number is the difference between the first number and the total number of the sequence elements.

If the total number of the sequence elements is greater than or equal to the first number, sentence truncation can be performed on the left portion of the long sequence, so that the number of sequence elements in the long sequence is equal to the first number, and the sequence elements of the above-mentioned terminating sentence are on the right portion of the long sequence. Then, the sequence elements from left to right in the truncated long sequence are put together to obtain a final long corpus sequence of the parallel corpus.

In this case, when the above-mentioned first sentence translation model needs to be used to translate the input sentence in the first language in the current round of conversation, the dialogue contents in the first language and the second language of the consecutive rounds of conversation before the current round of conversation are selected. The dialogue contents are combined with the input sentence in the first language in the current round of conversation, and they are put together to form a first long sequence to be translated according to the sequence of rounds of conversation. The first long sequence to be translated is then input into the first sentence translation model. The first sentence translation model then fully considers the respective expressions of the historical dialogue contents in the first language and the second language, and translates the input sentence in the first language in the current round of conversation into the input sentence in the second language that matches the input sentence in the first language in terms of words. The first long sequence to be translated including the input sentence in the first language in the current round of conversation can be expressed as: [ . . . , $L_{k-2}$, $H_{k-2}$, $L_{k-1}$, $H_{k-1}$, $L_k$], where k is an odd number, $L_k$ represents the input sentence in the first language in the current round of conversation, the current round of conversation is the (k+1)/2th round of conversation, and $H_k$ represents the input sentence in the second language in the current round of conversation translated by the first sentence translation model. The first long sequence to be translated and the long corpus sequence used for training the first sentence translation model have the same expression format, and both satisfy a preset first number of sequence element tokens.

It should be noted that, when the first long sequence to be translated is constructed, the sequence elements of the input sentence in the first language in the current round of conversation and the respective sequence elements of the dialogue contents in the first language and the second language in the historical round of conversation before the current round of conversation are filled into a blank long sequence from right to left and in reverse order of the time sequence of rounds of conversation, so as to allow the expression form of the long sequence with the filled sequence elements to be consistent with the above-mentioned long corpus sequence. Then, it is determined whether the number of filled sequence elements of the long sequence is less than the preset first number.

If the number of filled sequence elements of the long sequence is less than the preset first number, a specific number of blank sequence elements need to be filled on the left portion of the long sequence. Then, the sequence elements in the long sequence from left to right are put together to obtain the first long sequence to be translated. The specific number is the difference between the first number and the number of filled sequence elements. For example, if the current round of conversation is the first round of conversation, the historical round of conversation before the current round of conversation is zero. In this case, the left portion of the first long sequence to be translated including the input sentence in the first language in the current round of conversation needs to be filled with n blank sequence elements, where n is equal to the difference between the first number and the number of sequence elements involved in the input sentence in the first language in the first round of conversation.

If the number of filled sequence elements of the long sequence is greater than or equal to the preset first number, it needs to truncate the filling operation of sequence elements on the left portion of the long sequence in time, so that the maximum number of valid sequence elements of the long sequence is equal to the first number. Then, the sequence elements in the truncated long sequence from left to right are put together to obtain the first long sequence to be translated.

Step S230: Invoke a pre-stored multi-round conversation generation model to parse the input sentence in the second language in the current round of conversation, according to the dialogue contents in the second language in the historical rounds of conversation, to generate an output sentence in the second language in the current round of conversation, wherein the multi-round conversation generation module is obtained by perform training based on multi-round dialogue corpora in the second language.

The multi-round conversation generation model corresponds to the second language. After the computing device 10 receives an input sentence in the second language that has a translation relationship with the input sentence in the first language in the current round of conversation, the dialogue contents in the second language of the consecutive historical rounds of conversation before the current round of conversation can be selected. The dialogue contents are combined with the input sentence in the second language in the current round of conversation to form a long conversation sequence according to the time sequence of the rounds of conversation. The long conversation sequence is then input into the multi-round conversation generation model. The multi-round conversation generation model then generates an output sentence in the second language for the input sentence in the second language in the current round of conversation according to the historical second-language dialogue expressions. The second-language conversation operation of the same round of conversation may include the input operation of the input sentence in the second language and the output operation of the output sentence in the second language in the round of conversation. The long conversation sequence including the input sentence in the second language in the current round of conversation can be expressed as: [ . . . , $H_{k-2}$ $H_{k-1}$, $H_k$], where $H_k$ represents the input sentence in the second language in the current round of conversation, the current round of conversation is the (k+1)/2th round of conversation, and $H_{k+1}$ represents the output sentence in the second language in the current round of conversation generated by the multi-round conversation generation model corresponding to the second language, and k is an odd number.

The long conversation sequence input into the multi-round conversation generation model needs to satisfy a preset second number of sequence element tokens, and the second number may set to 256. When the long conversation sequence is constructed, the sequence elements of the input sentence in the second language in the current round of conversation and the respective sequence elements of the output sentences in the second language and the input sentences in the second language of the consecutive historical rounds of conversation before the current round of conversation are filled into a blank long sequence from right to left and in reverse order of the time sequence of rounds of conversation, so as to allow the expression form of the long sequence with the filled sequence elements to be consistent with the above-mentioned long conversation sequence. Then, it is determined whether the number of filled sequence elements of the long sequence is less than the preset second number.

If the number of the filled sequence elements of the long sequence is less than the preset second number, the left portion of the long sequence needs to be filled with n blank sequence elements, where n is equal to the difference between the second number and the number of the filled sequence elements. Then, the sequence elements of the long sequence from left to right are put together to obtain the current corresponding long conversation sequence.

If the number of the filled sequence elements of the long sequence is greater than or equal to the preset second number, it needs to truncate the filling operation of sequence elements on the left portion of the long sequence in time, so that the maximum number of valid sequence elements of the long sequence is equal to the second number. Then, the sequence elements in the truncated long sequence from left to right are put together to obtain the current corresponding long conversation sequence.

In one embodiment, the first number may be equal to the second number.

Step S240: Translate the output sentence in the second language in the current round of conversation, according to the dialogue contents in the first language and in the second language in the historical rounds of conversation, and the input sentence in the first language and the input sentence in the second language in the current round of conversation, to obtain at least one candidate result in the first language.

In one embodiment, after obtaining the output sentence in the second language in the current round of conversation, the computing device 10 will translate the output sentence in the second language in the current round of conversation based on the first-language dialogue contents and the second-language dialogue contents of the historical rounds of conversation before the current round of conversation, as well as the input sentence in the first language and the input sentence in the second language in the current round of conversation. Therefore, the context information and wording in the multi-round human-machine conversation in the first language and in the second language are fully considered, so that each translated first-language candidate result of the current round of conversation can fully match, in terms of words, the dialogue contents in the first language of the historical rounds of conversation and the input sentence in the first language of the current round of conversation. Each candidate result in the first language of the current round of conversation has a mutual translation relationship with the output sentence in the second language.

In one embodiment, the computing device 10 may store a second sentence translation model for performing sentence translation from the second language to the first language based on the historical dialogue contents. The second sentence translation model can be obtained by performing training parallel corpora between the first language and the second language of multiple rounds of continuous conversation in the open domain. Each parallel corpus required for training the second sentence translation model can be expressed by a long corpus sequence as follows: [ . . . , $H_{t-2}$, $L_{t-2}$, $H_{t-1}$, $L_{t-1}$, $H_t$, $L_t$], where H represents the sentences in the second language, L represents the sentences in the first language, $H_{t-n}$ represents a translated parallel corpus of $L_{t-n}$ that has the same subscript with $H_{t-n}$, where n=0, 1, 2, 3, 4 . . . . The first-language conversation operation of the same round of conversation may include the input operation of the input sentence in the first language and the output operation of the output sentence in the first language in the round of conversation. The second-language conversation operation of the same round of conversation may include the input operation of the input sentence in the second language and the output operation of the output sentence in the second language in the round of conversation. The specific meaning of each subsequence in the long corpus sequence required for training the second sentence translation model is the same as the specific meaning of each subsequence in the long corpus sequence required for training the first sentence translation model above, which will not be detailed here.

In the process of training the second sentence translation model, for the long corpus sequence of each parallel corpus used to train the second sentence translation model, the subsequence [ . . . , $H_{t-2}$, $L_{t-2}$, $H_{t-1}$, $L_{t-1}$, $H_t$, $L_t$] in the long corpus sequence can be used as the model input and the subsequence [L_t] can be used as the model output to train the second sentence translation model, which can ensure that the trained second sentence translation model can realize the sentence translation function from the second language to the first language based on historical dialogue contents.

The long corpus sequence of each parallel corpus required to train the second sentence translation model needs to satisfy a preset third number of sequence element tokens. For each parallel corpus for training the second sentence translation model, it needs to preferentially select the output sentence in the first language or the input sentence in the first language in a certain round of conversation in the parallel corpus as a terminating sentence. Then, the sequence elements of the terminating sentence, the sequence elements of the output sentence in the second language or the input sentence in the second language corresponding to the terminating sentence, and the respective sequence elements of the dialogue contents in the first language and the in the second language of the round of conversation before the terminating sentence, are put into a blank long sequence from right to left and in reverse order of the time sequence of rounds of conversation, so as to allow the expression form of the long sequence to be consistent with the above-mentioned long corpus sequence. Then, the total number of sequence elements of the valid sentences in the long sequence is counted, and it is determined whether the total number of the sequence elements is less than the third number.

If the total number of the sequence elements is less than the third number, a specific number of blank sequence elements need to be filled on the left portion of the long sequence. Then, the sequence elements in the long sequence from left to right are put together to obtain the final long corpus sequence of the parallel corpus. The specific number is the difference between the third number and the total number of the sequence elements.

If the total number of the sequence elements is greater than or equal to the third number, sentence truncation can be performed on the left portion of the long sequence, so that the number of sequence elements in the long sequence is equal to the third number, and the sequence elements of the above-mentioned terminating sentence are on the right portion of the long sequence. Then, the sequence elements from left to right in the truncated long sequence are put together to obtain a final long corpus sequence of the parallel corpus.

In this case, when the above-mentioned second sentence translation model needs to be used to translate the input sentence in the second language in the current round of conversation, the dialogue contents in the first language and the second language of the consecutive rounds of conversation before the current round of conversation are selected. The dialogue contents are combined with the input sentence in the first language, the input sentence in the second language, and the output sentence in the second language in the current round of conversation, and they are put together to form a second long sequence to be translated according to the time sequence of rounds of conversation. The second long sequence to be translated is then input into the second sentence translation model. The second sentence translation model then fully considers the respective expressions of the dialogue contents of the historical rounds of conversation and the input sentences in the first language and the second language in the current round of conversation, and translates the output sentence in the second language in the current round of conversation into at least one candidate result in the first language that matches the output sentence in the second language in the current round of conversation in terms of words. The second long sequence to be translated including the input sentence in the second language in the current round of conversation can be expressed as: $[\ldots, H_{k-2}, L_{k-2}, H_{k-1}, L_{k-1}, H_k, L_k, H_{k+1}]$, where $H_{k+1}$ represents the output sentence in the second language in the current round of conversation, and the current round of conversation is the (k+1)/2th round of conversation. $(L_{k+1}')^i$ represents the i-th candidate result in the first language in the current round of conversation translated by the second sentence translation model, where i is a natural number greater than or equal to 1. The second long sequence to be translated and the long corpus sequence used for training the second sentence translation model have the same expression format, and both satisfy the preset third number of sequence element tokens.

It should be noted that, when the second long sequence to be translated is constructed, the sequence elements of the output sentence in the second language in the current round of conversation, the sequence elements of the input sentence in the first language in the current round of conversation, the sequence elements of the input sentence in the second language in the current round of conversation, and the respective sequence elements of the dialogue contents in the first language and the second language in the historical round of conversation before the current round of conversation are filled into a blank long sequence from right to left and in reverse order of the time sequence of rounds of conversation, so as to allow the expression form of the long sequence with the filled sequence elements to be consistent with the above-mentioned long corpus sequence. Then, it is determined whether the number of filled sequence elements of the long sequence is less than the third number.

If the number of filled sequence elements of the long sequence is less than the preset third number, a specific number of blank sequence elements need to be filled on the left portion of the long sequence. Then, the sequence elements in the long sequence from left to right are put together to obtain the second long sequence to be translated. The specific number is the difference between the third number and the number of filled sequence elements.

If the total number of the sequence elements is greater than or equal to the third number, it needs to truncate the filling operation of sequence elements on the left portion of the long sequence in time, so that the maximum number of valid sequence elements of the long sequence is equal to the third number. Then, the sequence elements in the truncated long sequence from left to right are put together to obtain the second long sequence to be translated.

Step S250: Determine an output sentence in the first language in the current round of conversation from the at least one candidate result in the first language for output.

In one embodiment, after determining at least one candidate result in the first language in the current round of conversation, the computing device 10 can select a candidate result in the first language from the at least one candidate result in the first language, based on a specific rule or randomly, as the output sentence in the first language in the current round of conversation, which can ensure that the output sentence in the first language in the current round of conversation has excellent expression coherence in terms of semantics and context with the input sentence in the first language in the current round of conversation and the dialogue contents in the first language of the historical rounds of conversation. Therefore, the more mature multi-round conversation generation model for the second language (high-resource language) can be used for the first language (low-resource language) to realize correct and smooth multi-round human-machine conversation.

In the present application, by executing the steps S210 to S250, the computing device 10 can use the multi-round conversation generation model of a high-resource language to realize the multi-round human-machine conversation in a low-resource language, while combining the specific situation of the existing dialogue content into the translation process between sentences in the low-resource language and in the high-resource language, which enable the conversation in the low-resource language to have an excellent degree of coherence in terms of semantics and context. As a result, the multi-round conversation generation model of a high-resource language can be used for a low-resource language to achieve correct and smooth multi-round human-machine conversation.

Figure 4:
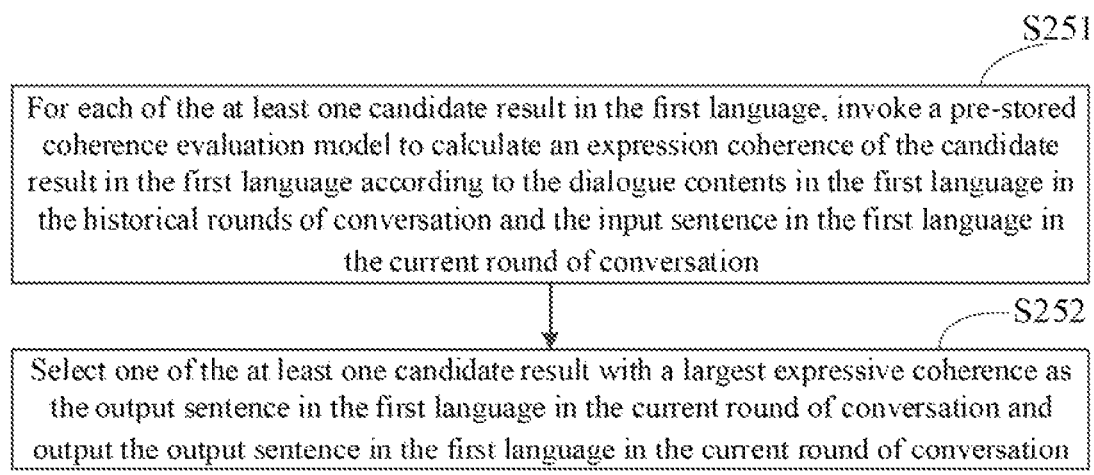
FIG. 4 is an exemplary flowchart of a step S250 of the method of FIG. 3 according to one embodiment.

Referring to FIG. 4, in one embodiment, step S250 may include steps S251 and S252. By implementing the steps S251 and S252, the quality of sentence reply in the process of human-machine conversation can be further improved for the low-resource language (e.g., the first language).

Step S251: For each of the at least one candidate result in the first language, invoke a pre-stored coherence evaluation model to calculate an expression coherence of the candidate result in the first language according to the dialogue contents in the first language in the historical rounds of conversation and the input sentence in the first language in the current round of conversation.

In one embodiment, after obtaining the candidate result in the first language in the current round of conversation, the computing device 10 can select the dialogue contents in the first language of the consecutive historical rounds of conversation before the current round of conversation, and the input sentence in the first language in the current round of conversation, which are combined with the candidate result in the first language in the current round of conversation to form a long sequence to be evaluated according to the time sequence of the rounds of conversation. The long sequence to be evaluated is then input into the coherence evaluation model. The coherence evaluation model then calculates the expression coherence of the candidate result in the first language in the current round of conversation in terms of semantics and context according to the historical first-language conversation expressions and the input sentence in the first language in the current round of conversation so as to obtain the expressive coherence of the candidate result in the first language. The long sequence to be evaluated including the candidate result in the first language in the current round of conversation can be expressed as: [ ..., $L_{k-2}$, $L_{k-1}$, $L_k$, $(L_{k+1}')^i$], where $(L_{k+1}')^i$ represents the i-th candidate result in the first language in the current round of conversation translated by the second sentence translation model, where i is a natural number greater than or equal to 1, $L_k$ represents the input sentence in the first language in the current round of conversation, the current round of conversation is the (k+1)/2th round of conversation, and $L_{k+1}$ represents the output sentence in the first language in the current round of conversation, and k is an odd number.

The long sequence to be evaluated that is input to the coherence evaluation model needs to satisfy a preset fourth number of sequence element tokens, and the fourth preset number may set to 256. When the long sequence to be evaluated is constructed, the sequence elements of the candidate result in the first language in the current round of conversation, and the sequence elements of the input sentence in the first language in the current round of conversation and the sequence elements of the dialogue contents in the first language of the consecutive historical rounds of conversation before the current round of conversation are filled in a long blank sequence from right to left and in reverse order of the time sequence of rounds of conversation, so as to allow the expression form of the long sequence with the filled sequence elements to be consistent with the above-mentioned long sequence to be evaluated. Then, it is determined whether the number of filled sequence elements of the long sequence is less than the fourth number.

If the number of filled sequence elements of the long sequence is less than the fourth number, the left portion of the long sequence needs to be filled with n blank sequence elements, where n is equal to the difference between the fourth number and the number of the filled sequence elements. Then, the sequence elements of the long sequence from left to right are put together to obtain the current corresponding long sequence to be evaluated.

If the number of filled sequence elements of the long sequence is greater than or equal to the fourth number, it needs to truncate the filling operation of sequence elements on the left portion of the long sequence in time, so that the maximum number of valid sequence elements of the long sequence is equal to the fourth number. Then, the sequence elements in the truncated long sequence from left to right are put together to obtain the current corresponding long sequence to be evaluated.

Step S252: Select one of the at least one candidate result with a largest expressive coherence as the output sentence in the first language in the current round of conversation and output the output sentence in the first language in the current round of conversation.

After invoking the coherence evaluation model to calculate the corresponding expression coherence for each candidate result in the first language in the current round of conversation, the computing device 10 can select the candidate result in the first language with the highest expressive coherence and output it as the output sentence in the first language in the current round of conversation. That is, the content with the highest expressive coherence can be selected from $(L_{k+1}')^i$ as $L_{k+1}$, so as to ensure that the content connection and text expression between the output sentence in the first language and the input sentence in the first language in the current round of conversation are natural, thereby improving the quality of sentence reply in the process of human-computer conversation in low-resource languages.

Therefore, by implementing the steps S251 and S252, it can be ensured that the content connection and text expression between the output sentence in the first language and the input sentence in the first language in the current round of conversation are natural, thereby improving the quality of sentence reply in the process of human-computer conversation in low-resource languages.

In order to ensure that the coherence evaluation model stored in the computing device 10 can effectively evaluate the coherence of the sentence reply in the process of the human-machine conversation in the first language, the embodiments of the present disclosure provide a training scheme for the coherent evaluation model. The specific implementation process of the training scheme for the coherent evaluation model is described in detail below.

Figure 5:
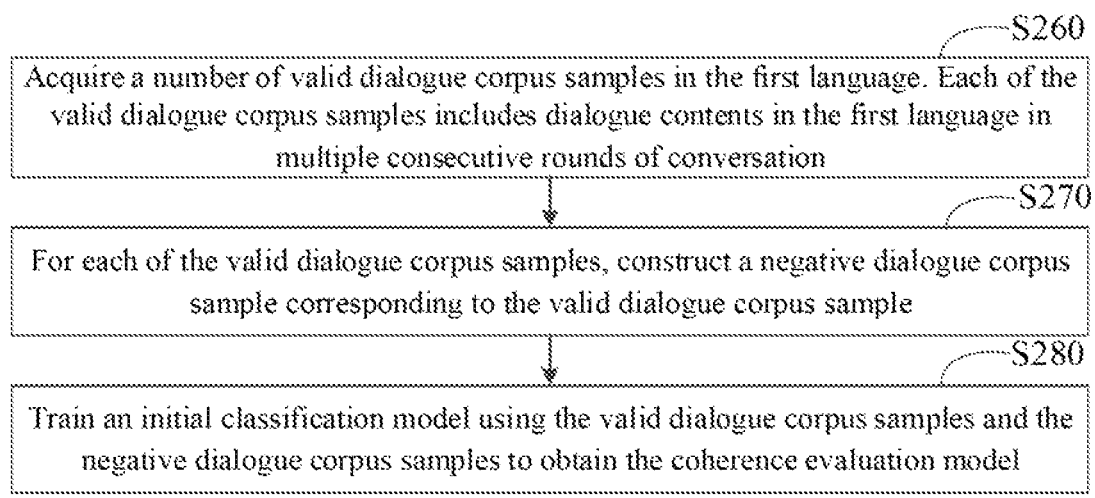
FIG. 5 is an exemplary flowchart of a method for a human-machine dialogue according to one embodiment.

Referring to FIG. 5, in one embodiment, the method for human-machine dialogue may further include steps S260 to S280. By implementing the steps S260 to S280, a coherence evaluation model that can effectively evaluate the coherence of sentence responses in the process of human-machine conversation in the first language can be trained.

Step S260: Acquire a number of valid dialogue corpus samples in the first language. Each of the valid dialogue corpus samples includes dialogue contents in the first language in multiple consecutive rounds of conversation.

In one embodiment, each valid dialogue corpus sample can be expressed by a long sequence of training corpus, and each long sequence of training corpus may include the dialogue contents in the first language of multiple consecutive rounds of conversation. The number of valid rounds of conversation corresponding to different valid dialogue corpus samples may be different.

The long sequences of training corpus and the long sequence to be evaluated may have the same expression format, and the long sequence of training corpus needs to satisfy the fourth number of sequence element tokens. For each valid dialogue corpus sample, the output sentence in the first language or the input sentence in the first language of a certain round of conversation in the valid dialogue corpus sample is selected as a terminating sentence. The sequence elements of the terminating sentence and the sequence elements of the dialogue contents in the first language generated before the terminating sentence are filled in a blank long sequence from right to left and in reverse order of the time sequence of rounds of conversation, so as to allow the expression form of the long sequence with the filled sequence elements to be consistent with the above-mentioned long sequence to be evaluated. Then, it is determined whether the number of filled sequence elements of the long sequence is less than the fourth number.

If the number of filled sequence elements of the long sequence is less than the fourth number, the left portion of the long sequence needs to be filled with n blank sequence elements, where n is equal to the difference between the fourth number and the number of the filled sequence elements. Then, the sequence elements of the long sequence from left to right are put together to obtain the long sequence of training corpus corresponding to the valid dialogue corpus sample.

If the number of filled sequence elements of the long sequence is greater than or equal to the fourth number, it needs to truncate the filling operation of sequence elements on the left portion of the long sequence in time, so that the maximum number of valid sequence elements of the long sequence is equal to the fourth number. Then, the sequence elements in the truncated long sequence from left to right are put together to obtain the long sequence of training corpus corresponding to the valid dialogue corpus sample.

Step S270: For each of the valid dialogue corpus samples, construct a negative dialogue corpus sample corresponding to the valid dialogue corpus sample.

In the embodiment, the negative dialogue corpus sample is used as a negative sample of the valid dialogue corpus sample. Each negative dialogue corpus sample and its corresponding valid dialogue corpus sample differ only in the output sentence in the first language in the last round of conversation. In one embodiment, the negative dialogue corpus samples and the above-mentioned valid dialogue corpus samples can be expressed in the same sequence expression format, and both satisfy the fourth number of sequence element tokens. Compared with the corresponding long sequence of training corpus, the long sequence of negative corpus corresponding to the negative dialogue corpus sample differs from the long sequence of the training corpus in the content of the sequence elements corresponding to the output sentence in the first language in the last round of conversation.

Figure 6:
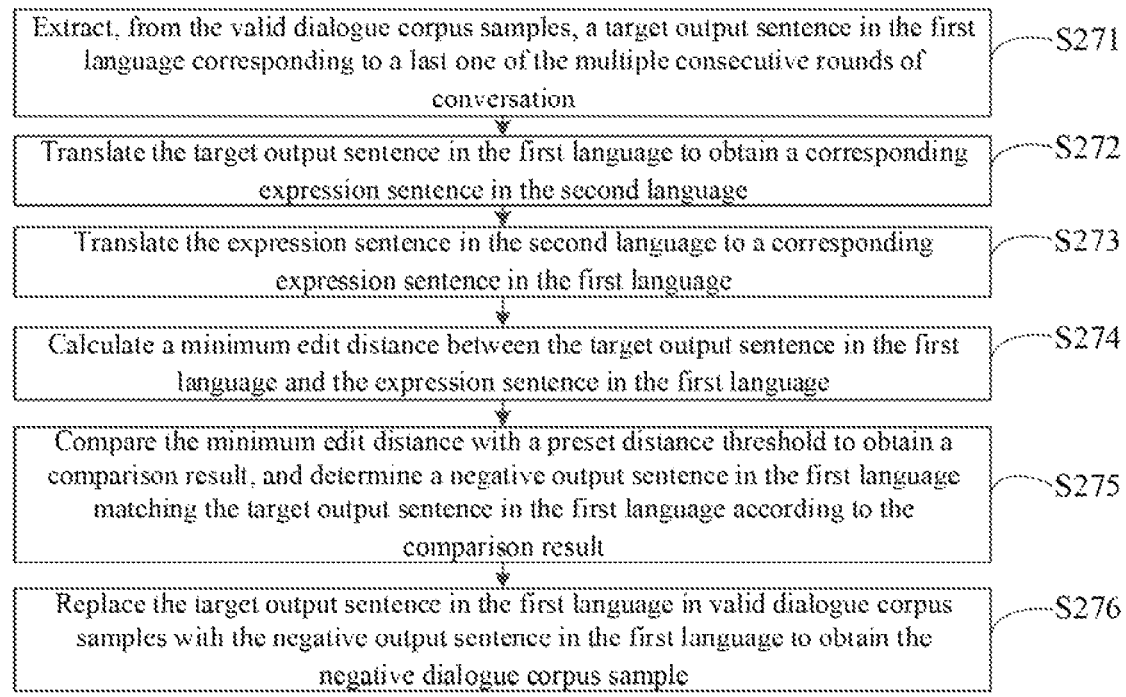
FIG. 6 is an exemplary flowchart of a step S270 of the method of FIG. 5 according to one embodiment

Referring to FIG. 6, in one embodiment, for each valid dialogue corpus sample, the step S270 may include steps S271 to S276.

Step S271: Extract, from the valid dialogue corpus samples, a target output sentence in the first language corresponding to a last one of the multiple consecutive rounds of conversation.

Step S272: Translate the target output sentence in the first language to obtain a corresponding expression sentence in the second language.

Step S273: Translate the expression sentence in the second language to a corresponding expression sentence in the first language.

Step S274: Calculate a minimum edit distance between the target output sentence in the first language and the expression sentence in the first language.

Step S275: Compare the minimum edit distance with a preset distance threshold to obtain a comparison result, and determine a negative output sentence in the first language matching the target output sentence in the first language according to the comparison result.

Step S276: Replace the target output sentence in the first language in valid dialogue corpus samples with the negative output sentence in the first language to obtain the negative dialogue corpus sample.

The above-mentioned first sentence translation model or a general machine translation model can be used to translate the target output sentence in the first language into the expression sentence in the second language. The above-mentioned second sentence translation model or a general machine translation model can be used to translate the expression sentences in the second language into the translating the second language expression sentence into the first language expression sentences in the first language. In one embodiment, by calculating the Jaccard similarity between the target output sentence in the first language and the expression sentence in the first language, the minimum edit distance between the target output sentence in the first language and the expression sentence in the first language can be obtained.

In one embodiment, determining the negative output sentence in the first language matching the target output sentence in the first language according to the comparison result may include the following steps: If the minimum edit distance is greater than the preset distance threshold, determining the expression sentence in the first language as the negative output sentence in the first language; and if the minimum edit distance is equal to the preset distance threshold, performing a synonym substitution on at least one word in the expression sentence in the first language to obtain the negative output sentence in the first language.

Therefore, by implementing the steps S271 to S276, for each valid dialogue corpus sample, a negative dialogue corpus sample corresponding to the valid dialogue corpus sample is constructed.

Step S280: Train an initial classification model using the valid dialogue corpus samples and the negative dialogue corpus samples to obtain the coherence evaluation model.

Therefore, by implementing the steps S260 to S280, it is ensured that the trained coherence evaluation model can effectively evaluate the coherence of the sentence response in the process of human-machine conversation in the first language.

In one embodiment, in order to ensure that the computing device 10 can implement the foregoing method for human-machine dialogue through the human-machine dialogue module, the present disclosure implements the aforementioned functions by dividing the human-machine dialogue module into functional modules, which will be described below.

Referring to FIG. 7, in one embodiment, the human-machine dialogue module may include an input sentence acquiring module 110, an input sentence translation module 120, an output sentence generation module 130, an output sentence translation module 140, and an output sentence reply module 150.

The input sentence acquiring module 110 is to acquire an input sentence in a first language in a current round of conversation. The input sentence translation module 120 is to translate the input sentence in the first language in the current round of conversation to obtain an input sentence in a second language in the current round of conversation, according to dialogue contents in the first language and dialogue contents in the second language that have a mutual translation relationship with the dialogue contents in the first language in historical rounds of conversation. The dialogue contents in the first language may include input sentences in the first language and output sentences in the first language in corresponding rounds of conversation, and the dialogue contents in the second language may input sentences in the second language and output sentences in the second language in corresponding rounds of conversation.

The output sentence generation module 130 is to invoke a pre-stored multi-round conversation generation model to parse the input sentence in the second language in the current round of conversation, according to the dialogue contents in the second language in the historical rounds of conversation, to generate an output sentence in the second language in the current round of conversation, wherein the multi-round conversation generation module is obtained by perform training based on multi-round dialogue corpora in the second language. The output sentence translation module 140 is to translate the output sentence in the second language in the current round of conversation, according to the dialogue contents in the first language and in the second language in the historical rounds of conversation, and the input sentence in the first language and the input sentence in the second language in the current round of conversation, to obtain at least one candidate result in the first language. The output sentence reply module 150 is to determine an output sentence in the first language in the current round of conversation from the at least one candidate result in the first language for output.

Figure 8:
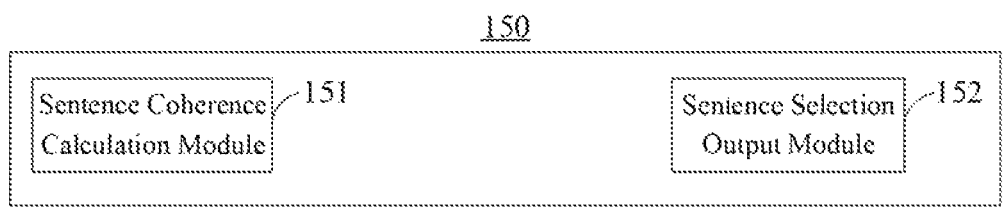
FIG. 8 is a schematic block diagram of the output sentence reply module of FIG. 7 according to one embodiment.

Referring to FIG. 8, in one embodiment, the output sentence reply module 150 may include a sentence coherence calculation module 151 and a sentence selection output module 152.

The sentence coherence calculation module 151 is to, for each of the at least one candidate result in the first language, invoke a pre-stored coherence evaluation model to calculate an expression coherence of the candidate result in the first language according to the dialogue contents in the first language in the historical rounds of conversation and the input sentence in the first language in the current round of conversation. The sentence selection output module 152 is to select one of the at least one candidate result with a largest expressive coherence as the output sentence in the first language in the current round of conversation and output the output sentence in the first language in the current round of conversation.

Figure 9:
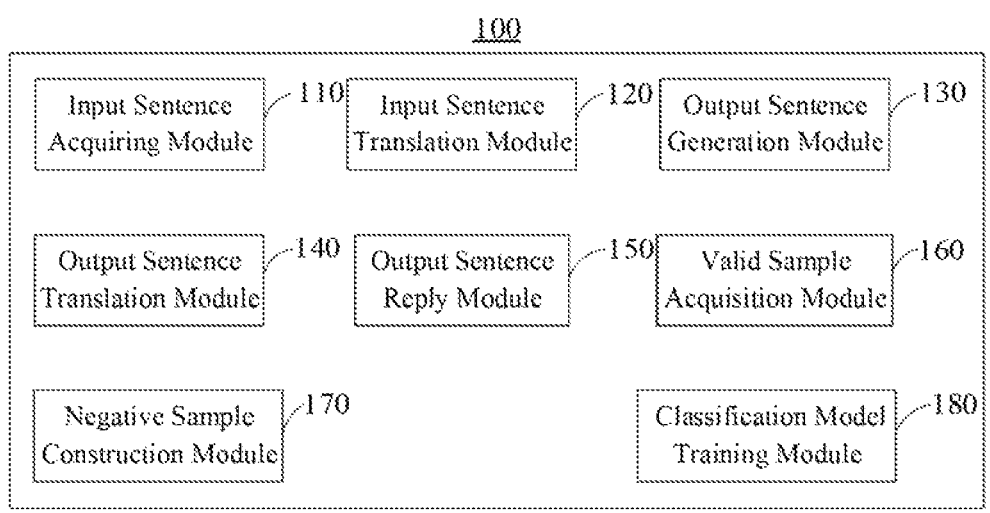
FIG. 9 is a schematic block diagram of a human-machine dialogue module according to one embodiment.

Referring to FIG. 9, in one embodiment, the human-machine dialogue module may further include a valid sample acquisition module 160, a negative sample construction module 170 and a classification model training module 180.

The valid sample acquisition module 160 is to acquire a number of valid dialogue corpus samples in the first language. Each of the valid dialogue corpus samples includes dialogue contents in the first language in multiple consecutive rounds of conversation. The negative sample construction module 170 is to, for each of the valid dialogue corpus samples, construct a negative dialogue corpus sample corresponding to the valid dialogue corpus sample. The classification model training module 180 is to train an initial classification model using the valid dialogue corpus samples and the negative dialogue corpus samples to obtain the coherence evaluation model.

Figure 10:
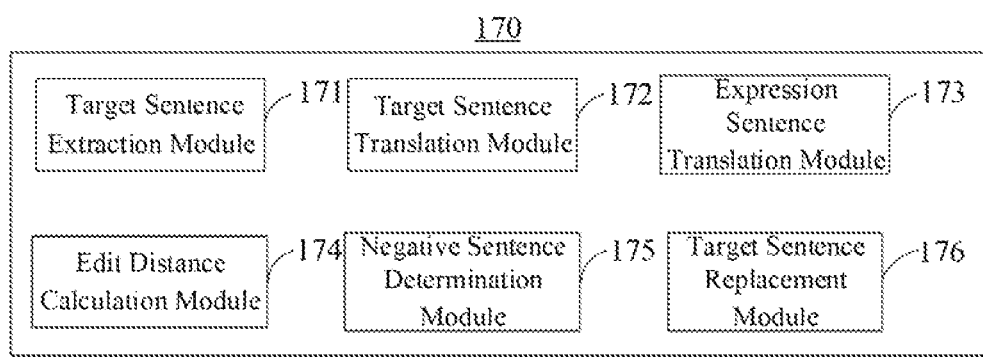
FIG. 10 is a schematic block diagram of the negative sample construction module of FIG. 9 according to one embodiment.

Referring to FIG. 10, in one embodiment, the negative sample construction module 170 may include a target sentence extraction module 171, a target sentence translation module 172, an expression sentence translation module 173, an edit distance calculation module 174, a negative sentence determination module 175, and a target sentence replacement module 176.

The target sentence extraction module 171 is to extract, from the valid dialogue corpus samples, a target output sentence in the first language corresponding to a last one of the multiple consecutive rounds of conversation. The target sentence translation module 172 is to translate the target output sentence in the first language to obtain a corresponding expression sentence in the second language. The expression sentence translation module 173 is to translate the expression sentence in the second language to a corresponding expression sentence in the first language. The edit distance calculation module 174 is to calculate a minimum edit distance between the target output sentence in the first language and the expression sentence in the first language. The negative sentence determination module 175 is to compare the minimum edit distance with a preset distance threshold to obtain a comparison result, and determine a negative output sentence in the first language matching the target output sentence in the first language according to the comparison result. The target sentence replacement module 176 is to replace the target output sentence in the first language in valid dialogue corpus samples with the negative output sentence in the first language to obtain the negative dialogue corpus sample.

In one embodiment, to determine a negative output sentence in the first language matching the target output sentence in the first language according to the comparison result, the negative sentence determination module 175 is to: determine the expression sentence in the first language as the negative output sentence in the first language if the minimum edit distance is greater than the preset distance threshold, and performing a synonym substitution on at least one word in the expression sentence in the first language to obtain the negative output sentence in the first language if the minimum edit distance is equal to the preset distance threshold.

It should be noted that the basic principle and the technical effect of the human-machine dialogue module provided by the embodiments of the present disclosure are the same as the aforementioned method for human-machine dialogue. For the sake of brevity, for the parts not mentioned here, reference may be made to the foregoing description of the embodiments of the method for human-machine dialogue.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

In the human-machine dialogue method, computing device and readable storage medium provided in the present disclosure, after the input sentence in the first language in the current round of conversation is obtained, the input sentence in the first language in the current round of conversation will be translated according to the dialogue contents in the first language in the historical rounds of conversation and the dialogue contents in the second language that has a mutual translation relationship with the dialogue contents in the first language, to obtain the corresponding input sentence in the second language. The input sentence in the second language in the current round of conversation is then parsed to generate the corresponding output sentence in the second language based on a multi-round conversation generation model for the second language according to the dialogue contents in the second language of the historical rounds of conversation. The output sentence in the second language in the current round of conversation is then translated according to the dialogue contents in the first language and in the second language of the historical rounds of conversation, as well as the input sentence in the first language and the input sentence in the second language in the current round of conversation to obtain at least one candidate result in the first language. The output sentence in the first language in the current round of conversation is determined from the at least one candidate result in the first language and outputted. Therefore, the multi-round conversation generation model for high-resource languages can be used to realize multi-round human-machine conversation in low-resource languages. In addition, based on the specific situation of the existing dialogue contents, the inter-translation operation between the sentences in the low-resource language and the high-resource language sentence can be realized, and the expression coherence of the multi-round human-machine dialogue contents in the low-resource language is improved in terms of semantics and context.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for human-machine dialogue, comprising:

acquiring an input sentence in a first language in a current round of conversation;

translating, through a first sentence translation model, the input sentence in the first language in the current round of conversation to obtain an input sentence in a second language in the current round of conversation, according to dialogue contents in the first language and dialogue contents in the second language that have a mutual translation relationship with the dialogue contents in the first language in historical rounds of conversation, wherein the dialogue contents in the first language comprise input sentences in the first language and output sentences in the first language in corresponding rounds of conversation, and the dialogue contents in the second language comprise input sentences in the second language and output sentences in the second language in corresponding rounds of conversation, and wherein the first sentence translation model is obtained by performing training parallel corpora between the second language and the first language of multiple rounds of continuous conversation in open domain;

invoking a pre-stored multi-round conversation generation model to parse the input sentence in the second language in the current round of conversation, according to the dialogue contents in the second language in the historical rounds of conversation, to generate an output sentence in the second language in the current round of conversation, wherein the multi-round conversation generation module is obtained by perform training based on multi-round dialogue corpora in the second language;

translating, through a second sentence translation model, the output sentence in the second language in the current round of conversation, according to the dialogue contents in the first language and in the second language in the historical rounds of conversation, and the input sentence in the first language and the input sentence in the second language in the current round of conversation, to obtain at least one candidate result in the first language, wherein the second sentence translation model is obtained by performing training parallel corpora between the first language and the second language of multiple rounds of continuous conversation in the open domain; and determining an output sentence in the first language in the current round of conversation from the at least one candidate result in the first language for output.

2. The method of claim 1, wherein determining the output sentence in the first language in the current round of conversation from the at least one candidate result in the first language for output comprises:

for each of the at least one candidate result in the first language, invoking a pre-stored coherence evaluation model to calculate an expression coherence of the candidate result in the first language according to the dialogue contents in the first language in the historical rounds of conversation and the input sentence in the first language in the current round of conversation; and selecting one of the at least one candidate result with a largest expressive coherence as the output sentence in the first language in the current round of conversation and outputting the output sentence in the first language in the current round of conversation.

3. The method of claim 2, further comprising:

acquiring a plurality of valid dialogue corpus samples in the first language, wherein each of the valid dialogue corpus samples comprises dialogue contents in the first language in multiple consecutive rounds of conversation;

for each of the valid dialogue corpus samples, constructing a negative dialogue corpus sample corresponding to the valid dialogue corpus sample; and training an initial classification model using the plurality of the valid dialogue corpus samples and the negative dialogue corpus samples to obtain the coherence evaluation model.

4. The method of claim 3, wherein constructing a negative dialogue corpus sample corresponding to the valid dialogue corpus sample comprises:

extracting, from the plurality of valid dialogue corpus samples, a target output sentence in the first language corresponding to a last one of the multiple consecutive rounds of conversation;

translating the target output sentence in the first language to obtain a corresponding expression sentence in the second language;

translating the expression sentence in the second language to a corresponding expression sentence in the first language;

calculating a minimum edit distance between the target output sentence in the first language and the expression sentence in the first language;

comparing the minimum edit distance with a preset distance threshold to obtain a comparison result, and determining a negative output sentence in the first language matching the target output sentence in the first language according to the comparison result; and replacing the target output sentence in the first language in valid dialogue corpus samples with the negative output sentence in the first language to obtain the negative dialogue corpus sample.

5. The method of claim 4, wherein determining the negative output sentence in the first language matching the target output sentence in the first language according to the comparison result comprises:

in response to the minimum edit distance being greater than the preset distance threshold, determining the expression sentence in the first language as the negative output sentence in the first language; and in response to the minimum edit distance being equal to the preset distance threshold, performing a synonym substitution on at least one word in the expression sentence in the first language to obtain the negative output sentence in the first language.

6. The method of claim 1, wherein each parallel corpus required for training the first sentence translation model is expressed by a long corpus sequence as follows:

$$[\ldots, L_{t-2}, H_{t-2}, L_{t-1}, H_{t-1}, L_t, H_t],$$

where, t is an integer, H represents sentences in the second language, L represents sentences in the first language, and $H_{t-n}$ represents a translated parallel corpus of $L_{t-n}$ that has same subscript with $H_{t-n}$, wherein n=0, 1, 2, 3, 4 ...;

wherein a first-language conversation operation of a same round of conversation comprises: an input operation of an input sentence in the first language, and an output operation of an output sentence in the first language in a round of conversation; and a second-language conversation operation of the same round of conversation comprises: an input operation of an input sentence in the second language, and an output operation of an output sentence in the second language in the round of conversation.

7. The method of claim 6, wherein, when t is an even number, $L_t$ represents an output sentence in the first language in the t/2th round of conversation, $L_{t-1}$ represents an input sentence in the first language in the t/2th round of conversation, $H_t$ represents an output sentence in the second language in the t/2th round of conversation, $H_{t-1}$ represents an input sentence in the second language in the t/2th round of conversation, $H_{t-2}$ represents an output sentence in the second language in the (t−2)/2th round of conversation, and $L_{t-2}$ represents an output sentence in the first language in the (t−2)/2th round of conversation.

8. The method of claim 6, wherein, when t is an odd number, $L_t$ represents an input sentence in the first language in the (t+1)/2th round of conversation, $L_{t-1}$ represents an output sentence in the first language in the (t−1)/2th round of conversation, $H_t$ represents an input sentence in the second language in the (t+1)/2th round of conversation, $H_{t-1}$ represents an output sentence in the second language in the (t−1)/2th round of conversation, $H_{t-2}$ represents an input sentence in the second language in the (t−1)/2th round of conversation, and $L_{t-2}$ represents an input sentence in the first language in the (t−1)/2th round of conversation.

9. The method of claim 6, wherein each sentence in the long corpus sequence is expressed by a sentence sequence comprising words and punctuation in the first language or the second language, the sentence sequence comprises sequence elements, each of the sequence elements represents a character composition of a corresponding sentence, and each of the sequence elements represents one of the words and punctuations corresponding to the first language or the second language.

10. The method of claim 6, wherein in a process of training the first sentence translation model, for the long corpus sequence of each parallel corpus used to train the first sentence translation model, the subsequence [..., $L_{t-2}$, $H_{t-2}$, $L_{t-1}$, $H_{t-1}$, $L_t$] in the long corpus sequence is used as a model input, and the subsequence [$H_t$] is used as a model output to train the first sentence translation model.

11. The method of claim 6, wherein the long corpus sequence of each parallel corpus used to train the first sentence translation model needs to satisfy a preset first number of sequence element tokens, and each sequence element token carries one sequence element content.

12. The method of claim 11, wherein the first number is set to 256.

13. The method of claim 1, wherein each parallel corpus required for training the second sentence translation model is expressed by a long corpus sequence as follows:

$$[\ldots, H_{t-2}, L_{t-2}, H_{t-1}, L_{t-1}, H_t, L_t],$$

where, t is an integer, H represents sentences in the second language, L represents sentences in the first language, and $H_{t-n}$ represents a translated parallel corpus of $L_{t-n}$ that has a same subscript with $H_{t-n}$, wherein n=0, 1, 2, 3, 4 . . . ;

wherein a first-language conversation operation of a same round of conversation comprises: an input operation of an input sentence in the first language, and an output operation of an output sentence in the first language in a round of conversation; and a second-language conversation operation of the same round of conversation comprises: an input operation of an input sentence in the second language, and an output operation of an output sentence in the second language in the round of conversation.

14. The method of claim 13, wherein in a process of training the second sentence translation model, for the long corpus sequence of each parallel corpus used to train the second sentence translation model, the subsequence [ . . . , $H_{t-2}, L_{t-2}, H_{t-1}, L_{t-1}, H_t$] in the long corpus sequence is used as a model input, and the subsequence [$L_t$] is used as a model output to train the second sentence translation model.

15. A computing device comprising:
one or more processors; and
a memory coupled to the one or more processors, the memory storing programs that, when executed, cause the one or more processors to:
acquire an input sentence in a first language in a current round of conversation;
translate, through a first sentence translation model, the input sentence in the first language in the current round of conversation to obtain an input sentence in a second language in the current round of conversation, according to dialogue contents in the first language and dialogue contents in the second language that have a mutual translation relationship with the dialogue contents in the first language in historical rounds of conversation, wherein the dialogue contents in the first language comprise input sentences in the first language and output sentences in the first language in corresponding rounds of conversation, and the dialogue contents in the second language comprise input sentences in the second language and output sentences in the second language in corresponding rounds of conversation, and wherein the first sentence translation model is obtained by performing training parallel corpora between the second language and the first language of multiple rounds of continuous conversation in open domain;
invoke a pre-stored multi-round conversation generation model to parse the input sentence in the second language in the current round of conversation, according to the dialogue contents in the second language in the historical rounds of conversation, to generate an output sentence in the second language in the current round of conversation, wherein the multi-round conversation generation module is obtained by perform training based on multi-round dialogue corpora in the second language;
translate, through a second sentence translation model, the output sentence in the second language in the current round of conversation, according to the dialogue contents in the first language and in the second language in the historical rounds of conversation, and the input sentence in the first language and the input sentence in the second language in the current round of conversation, to obtain at least one candidate result in the first language, wherein the second sentence translation model is obtained by performing training parallel corpora between the first language and the second language of multiple rounds of continuous conversation in the open domain; and
determine an output sentence in the first language in the current round of conversation from the at least one candidate result in the first language for output.

16. The computing device of claim 15, wherein, to determine the output sentence in the first language in the current round of conversation from the at least one candidate result in the first language for output, the programs, when executed, cause the one or more processors to:
for each of the at least one candidate result in the first language, invoke a pre-stored coherence evaluation model to calculate an expression coherence of the candidate result in the first language according to the dialogue contents in the first language in the historical rounds of conversation and the input sentence in the first language in the current round of conversation; and
select one of the at least one candidate result with a largest expressive coherence as the output sentence in the first language in the current round of conversation and output the output sentence in the first language in the current round of conversation.

17. The computing device of claim 16, wherein the programs, when executed, further cause the one or more processors to:
acquire a plurality of valid dialogue corpus samples in the first language, wherein each of the valid dialogue corpus samples comprises dialogue contents in the first language in multiple consecutive rounds of conversation;
for each of the valid dialogue corpus samples, construct a negative dialogue corpus sample corresponding to the valid dialogue corpus sample; and
train an initial classification model using the plurality of the valid dialogue corpus samples and the negative dialogue corpus samples to obtain the coherence evaluation model.

18. The computing device of claim 17, wherein, to construct a negative dialogue corpus sample corresponding to the valid dialogue corpus sample, the programs, when executed, cause the one or more processors to:
extract, from the plurality of valid dialogue corpus samples, a target output sentence in the first language corresponding to a last one of the multiple consecutive rounds of conversation;
translate the target output sentence in the first language to obtain a corresponding expression sentence in the second language;
translate the expression sentence in the second language to a corresponding expression sentence in the first language;
calculate a minimum edit distance between the target output sentence in the first language and the expression sentence in the first language;
compare the minimum edit distance with a preset distance threshold to obtain a comparison result, and determine a negative output sentence in the first language matching the target output sentence in the first language according to the comparison result; and
replace the target output sentence in the first language in valid dialogue corpus samples with the negative output sentence in the first language to obtain the negative dialogue corpus sample.

19. The computing device of claim 18, wherein, to determine the negative output sentence in the first language matching the target output sentence in the first language according to the comparison result, the programs, when executed, cause the one or more processors to:
  in response to the minimum edit distance being greater than the preset distance threshold, determine the expression sentence in the first language as the negative output sentence in the first language; and
  in response to the minimum edit distance being equal to the preset distance threshold, perform a synonym substitution on at least one word in the expression sentence in the first language to obtain the negative output sentence in the first language.

20. A non-transitory computer-readable storage medium storing instructions that, when executed by at least one processor, cause the at least one processor to perform a method for a method for humanoid-machine dialogue, the method comprising:
  acquiring an input sentence in a first language in a current round of conversation;
  translating the input sentence in the first language in the current round of conversation to obtain an input sentence in a second language in the current round of conversation, according to dialogue contents in the first language and dialogue contents in the second language that have a mutual translation relationship with the dialogue contents in the first language in historical rounds of conversation, wherein the dialogue contents in the first language comprise input sentences in the first language and output sentences in the first language in corresponding rounds of conversation, and the dialogue contents in the second language comprise input sentences in the second language and output sentences in the second language in corresponding rounds of conversation;
  invoking a pre-stored multi-round conversation generation model to parse the input sentence in the second language in the current round of conversation, according to the dialogue contents in the second language in the historical rounds of conversation, to generate an output sentence in the second language in the current round of conversation, wherein the multi-round conversation generation module is obtained by perform training based on multi-round dialogue corpora in the second language;
  translating the output sentence in the second language in the current round of conversation, according to the dialogue contents in the first language and in the second language in the historical rounds of conversation, and the input sentence in the first language and the input sentence in the second language in the current round of conversation, to obtain at least one candidate result in the first language; and
  determining an output sentence in the first language in the current round of conversation from the at least one candidate result in the first language for output;
  wherein determining the output sentence in the first language in the current round of conversation from the at least one candidate result in the first language for output comprises:
    for each of the at least one candidate result in the first language, invoking a pre-stored coherence evaluation model to calculate an expression coherence of the candidate result in the first language according to the dialogue contents in the first language in the historical rounds of conversation and the input sentence in the first language in the current round of conversation; and
    selecting one of the at least one candidate result with a largest expressive coherence as the output sentence in the first language in the current round of conversation and outputting the output sentence in the first language in the current round of conversation;
  wherein the method further comprises:
    acquiring a plurality of valid dialogue corpus samples in the first language, wherein each of the valid dialogue corpus samples comprises dialogue contents in the first language in multiple consecutive rounds of conversation;
    for each of the valid dialogue corpus samples, constructing a negative dialogue corpus sample corresponding to the valid dialogue corpus sample; and
    training an initial classification model using the plurality of the valid dialogue corpus samples and the negative dialogue corpus samples to obtain the coherence evaluation model;
  wherein constructing a negative dialogue corpus sample corresponding to the valid dialogue corpus sample comprises:
    extracting, from the plurality of valid dialogue corpus samples, a target output sentence in the first language corresponding to a last one of the multiple consecutive rounds of conversation;
    translating the target output sentence in the first language to obtain a corresponding expression sentence in the second language;
    translating the expression sentence in the second language to a corresponding expression sentence in the first language;
    calculating a minimum edit distance between the target output sentence in the first language and the expression sentence in the first language;
    comparing the minimum edit distance with a preset distance threshold to obtain a comparison result, and determining a negative output sentence in the first language matching the target output sentence in the first language according to the comparison result; and
    replacing the target output sentence in the first language in valid dialogue corpus samples with the negative output sentence in the first language to obtain the negative dialogue corpus sample; and
  wherein determining the negative output sentence in the first language matching the target output sentence in the first language according to the comparison result comprises:
    in response to the minimum edit distance being greater than the preset distance threshold, determining the expression sentence in the first language as the negative output sentence in the first language; and
    in response to the minimum edit distance being equal to the preset distance threshold, performing a synonym substitution on at least one word in the expression sentence in the first language to obtain the negative output sentence in the first language.

\* \* \* \* \*